March 28, 1967          I. KAMLUKIN          3,311,186
RIDING TRACTOR
Filed Sept. 9, 1963          8 Sheets-Sheet 1
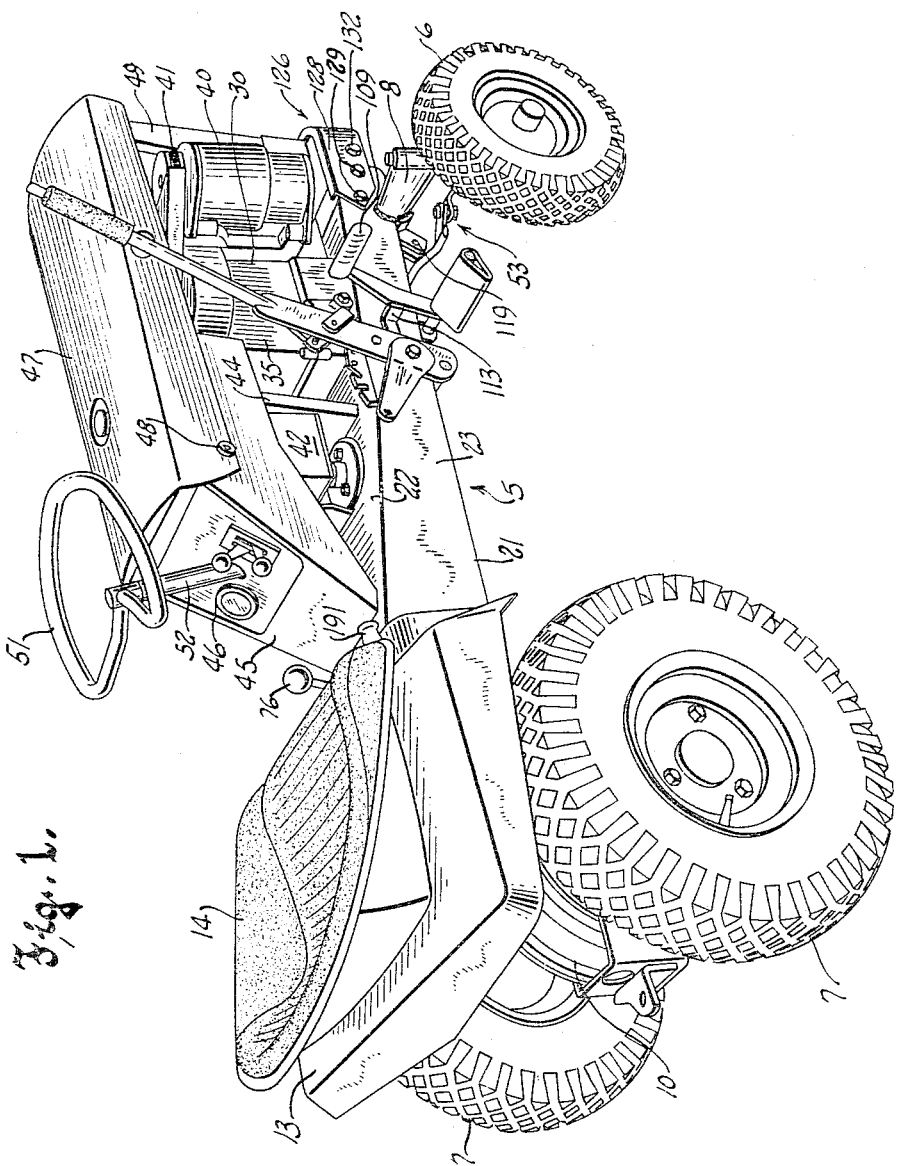

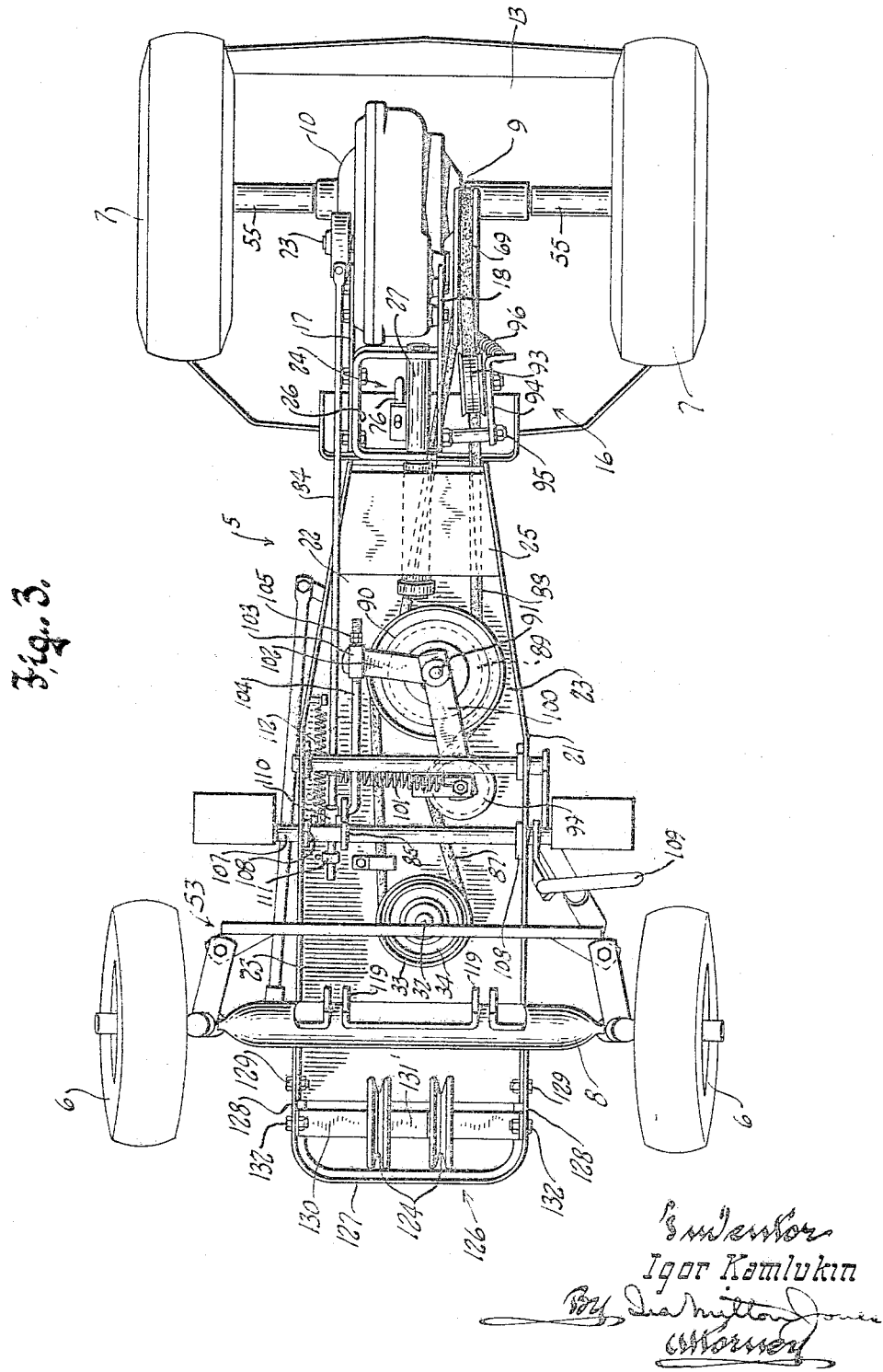

March 28, 1967     I. KAMLUKIN     3,311,186
RIDING TRACTOR
Filed Sept. 9, 1963     8 Sheets-Sheet 4
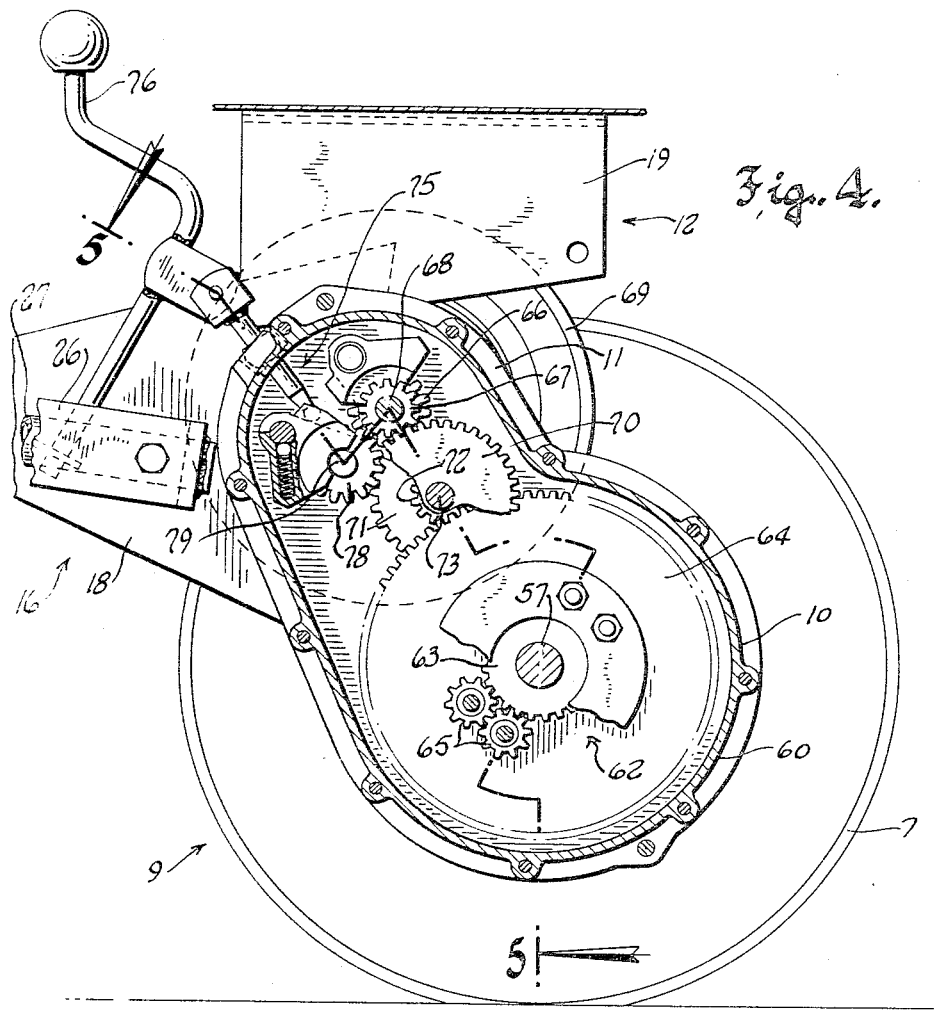
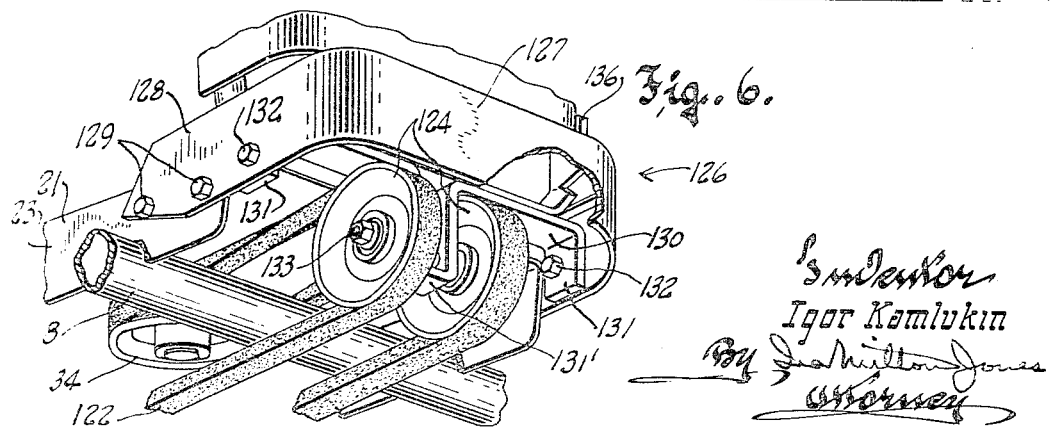

Inventor
Igor Kamlukin

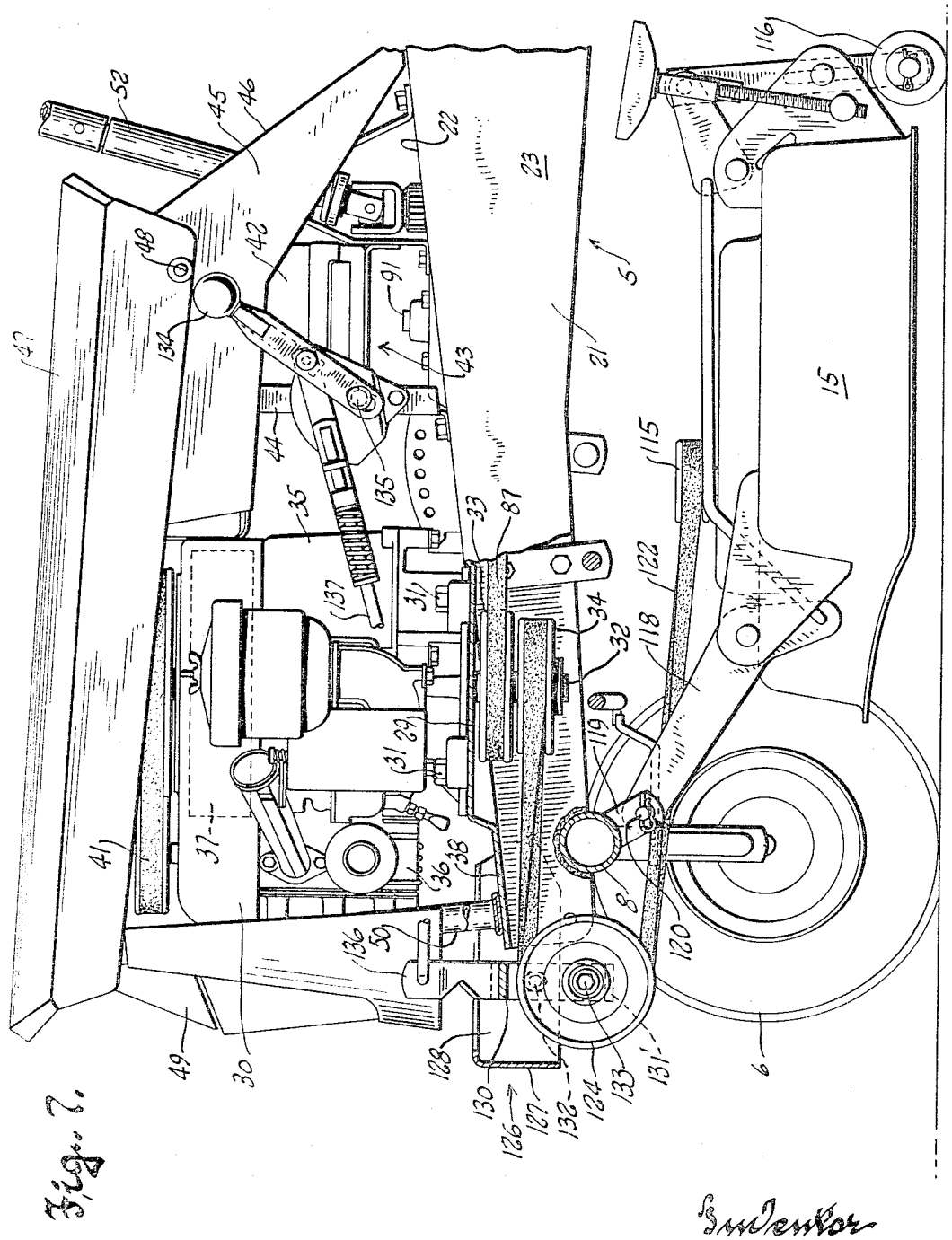

March 28, 1967

I. KAMLUKIN 3,311,186

RIDING TRACTOR

Filed Sept. 9, 1963

Inventor
Igor Kamlukin

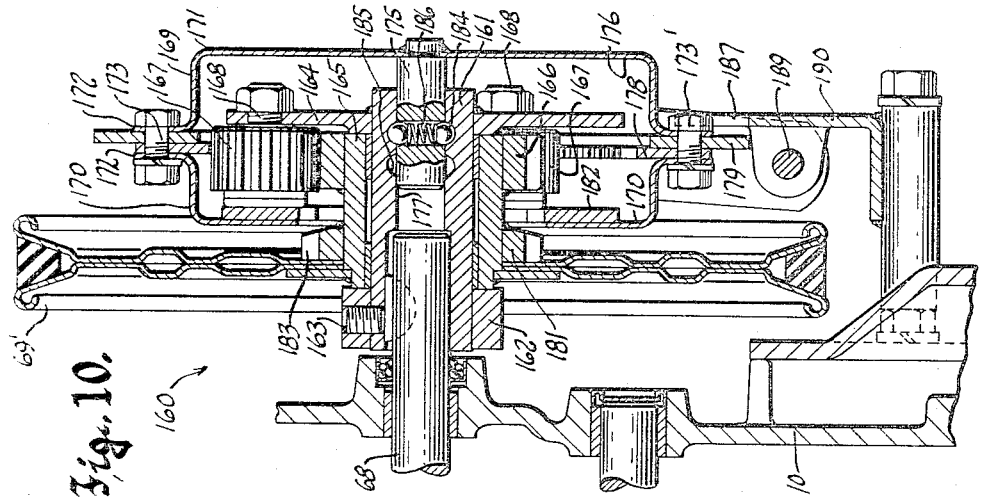
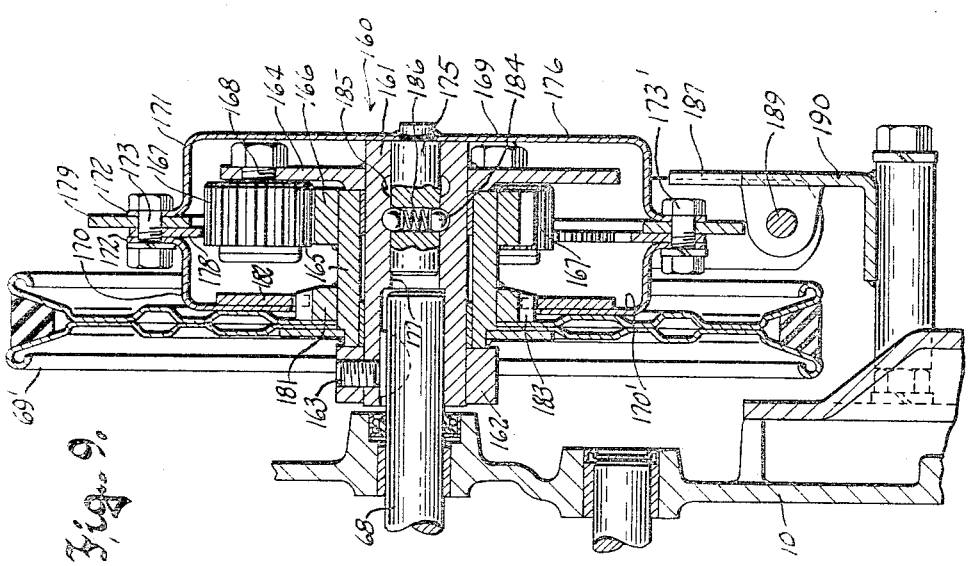

United States Patent Office 3,311,186
Patented Mar. 28, 1967

3,311,186
RIDING TRACTOR
Igor Kamlukin, Fox Point, Wis., assignor to Simplicity
Manufacturing Company, Port Washington, Wis., a corporation of Wisconsin
Filed Sept. 9, 1963, Ser. No. 307,382
11 Claims. (Cl. 180—70)

This invention relates to improvements in so called garden type riding tractors like that disclosed in my copending application Ser. No. 48,239, filed Aug. 8, 1960 and since issued as Patent No. 3,187,821.

Tractors of this nature are usually powered by a single cylinder air cooled internal combustion engine, and they are intended to pull and/or push various attachments or implements that may be readily tractively coupled to the tractor chassis. Certain implements which have rotatable or otherwise movable work performing elements may be driven from the tractor engine through suitable power take off means ordinarily provided for that purpose.

In general, the objects of this invention are to simplify and improve the construction of riding tractors of the character described for the purpose of achieving compactness, low center of gravity and silhouette, and easily accessible power take off means for transmitting driving torque from the power source of the tractor to the work performing elements of implements that may tractively be coupled to the tractor.

With these and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a perspective view of the tractor of this invention, showing one side thereof;

FIGURE 3 is a view looking at the underside of the tractor;

FIGURE 4 is an enlarged cross sectional view through the rear axle structure, illustrating the speed and direction change gearing through which torque is transmitted to the rear wheels of the tractor, and taken on the plane of the line 4—4 in FIGURE 5;

FIGURE 6 is a fragmentary perspective view of the power take off means and part of the belting used to drive the blade of a rotary lawn mower attachment that may be tractively coupled to the tractor chassis;

FIGURE 7 is an enlarged side elevational view, with parts broken away, showing a rotary lawn mower attachment tractively coupled to the front portion of the tractor chassis and its blade receiving driving torque from the power source of the tractor;

Figure 8:
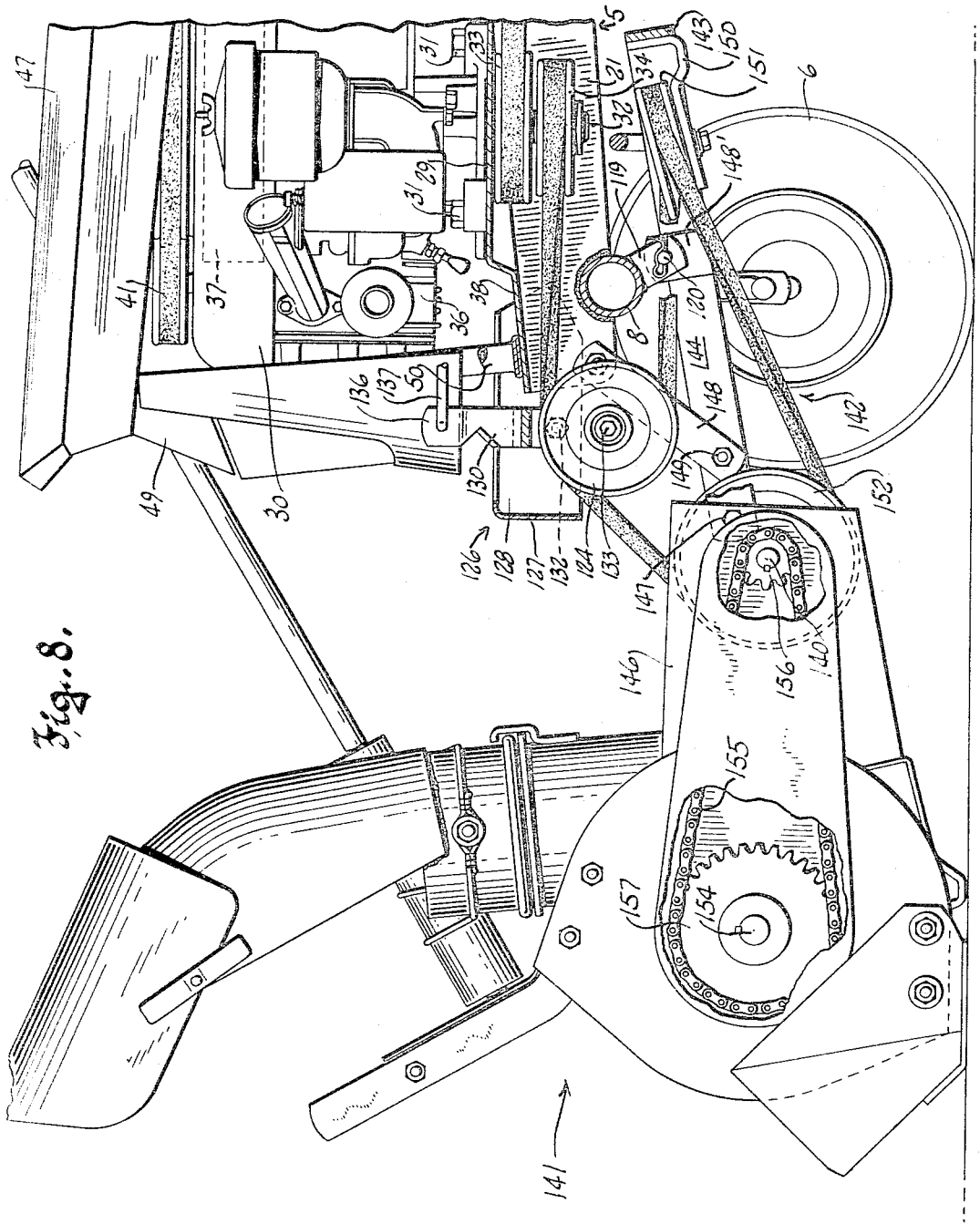

FIGURE 8 is a view similar to FIGURE 7, but showing a snow thrower attachment tractively coupled to the front of the tractor chassis with its rotor drive shaft driven from the power source of the tractor; and FIGURES 9 and 10 are similar detail sectional views illustrating a manually shiftable planetary gear attachment for the speed and direction change gearing by which additional low speeds of forward and rearward travel may be obtained as desired.

Referring now more particularly to the accompanying drawings, the tractor of this invention comprises an elongated chassis 5 carrying steerable wheels 6 at its front and drive wheels 7 at its rear. The front wheels 6 are mounted on the opposite ends of a transverse front axle 8 of tubular construction, which is rigidly fixed to the front portion of the chassis 5 at its underside; and the drive wheels 7 are located at the opposite ends of a rear axle structure 9 which includes a substantially upright gear case 10 intermediate the drive wheels. The gear case has an upwardly and forwardly projecting portion 11 with bracket means 12 thereon to support a substantially horizontal deck 13 and a seat 14 for an operator of the tractor, located substantially directly over the rear wheels.

The chassis 5 is supported by its wheels at an elevation sufficiently high as to accommodate a rotary lawn mowing attachment 15 therebeneath, as seen in FIGURE 7, in the space between the front and rear wheels of the tractor.

The chassis 5 comprises a relatively short forwardly extending rear chassis section 16 which includes the gear case 10 and the bracket means 12 on its upwardly and forwardly extending portion 11. For this purpose, the bracket means comprises a pair of plates 17 and 18 secured to opposite sides of the upper portion 11 of the gear case and extending forwardly therefrom in parallel relationship to one another. The bracket means also includes a second pair of plates 19, welded or otherwise secured to the plates 17 and 18 and extending upwardly therefrom, which have the rear deck 13 affixed to their upper edges.

The front portion of the chassis 5 is provided by an elongated frame 21 having its rear directly forwardly adjacent to the front edges of the brackets 17 and 18 on the gear case. The frame is of channel-shaped cross section having its web 22 uppermost and having depending side flanges 23 spaced from one another transversely of the chassis. The front axle 8 is welded to the channel flanges 23, in notches cut in their outer end portions as seen best in FIGURE 7.

The front and rear chassis sections are secured together at their adjacent ends by a unique swivel joint connection 24 that enables the front and rear axles of the tractor to tilt from side to side relative to one another about an axis that extends generally fore and aft of the chassis. Though the swivel axis lies in a vertical plane containing the longitudinal center line of the tractor, it is inclined upwardly and forwardly from the rear chassis section 16 so as to intersect the web 22 of the frame at a location rearwardly of the front wheels 6, for a purpose to be described shortly.

The swivel joint connection 24 comprises bearing brackets 25 and 26 that are respectively affixed to the underside of the rear portion of the frame 21 and to the forwardly extending portions of the plates 17 and 18, between the latter, which cooperate to receive and rotatably journal a tilt pin 27. Consequently, either the front or the rear section of the chassis can tilt from side to side relative to the other chassis section whenever the tractor wheels ride over uneven ground so as to minimize the danger of twisting or warping of the chassis framework as would be the case if the latter were rigid from one end to the other thereof.

At the forward portion of the frame 21, its web 22 is formed to provide a horizontal engine supporting platform 29, just rearwardly of the front axle 8, upon which a vertical shaft internal combustion engine 30 is seated and secured as by means of bolts 31. The crankshaft 32 of the engine projects downwardly through a hole (not shown) in the platform 29 to have its lower end portion disposed at the underside of the frame web. A V-belt drive pulley 33 and a similar V-belt power take off pulley 34 are affixed to this lower end portion of the crankshaft, with the drive pulley above the power take off pulley and thus closer to the frame web.

The drive pulley, of course, provides for the transmission of driving torque to the rear wheels 7, as will be described later on; and the power take off pulley 34 provides for the transmission of driving torque to the rotatable work performing element of an implement such as a lawn mower or a snow thrower that may be tractively coupled to the front portion of the chassis in a manner also to be described later.

Attention is directed to the fact that the vertical shaft engine, which is of the single cylinder air cooled type, is mounted on the supporting platform 29 with its crankcase 35 rearmost and its cylinder 36 extending forwardly therefrom toward the front of the tractor, and near the bottom of the engine. It has a flywheel-impeller 37 that is secured to the upper end of its crankshaft so as to be located at the top of the engine. Cooling air set in motion by the flywheel-impeller is thus directed downwardly across the finned surfaces on the cylinder and its head, and onto a forwardly and downwardly inclined web portion 38 of the frame ahead of the engine supporting platform 29, from whence the air can be deflected forwardly to the front of the tractor. While it is advantageous to mount the engine forwardly remote from an operator occupying the seat 14 in the manner described, it is a further feature that cooling air heated by its passage downwardly across the cylinder and head of the engine is deflected forwardly by the inclined web portion 38, and hence away from an operator occupying the seat on the rear of the tractor.

It should be noted that the frame 21 slopes downwardly toward the front axle 8 so that its forward portion is at a substantially minimum distance above ground level. This, together with the provision of a vertical shaft engine that is mounted upon the low front portion of the frame, not only assures a desirably low center of gravity and silhouette, but makes possible a degree of compactness of construction that is unique in riding tractors of the type herein concerned.

An additional feature of the construction described thus far is that the location and upward and forward slant of the axis of the swivel joint connection 24, with passage of the axis upwardly through the engine supporting platform 29, minimizes the overbalancing effect the engine might have upon the tractor as its frame tilts sidewise in either direction as a consequence of the front wheels 6 riding over uneven ground. An exceptional degree of stability is thus assured.

While not essential, the tractor may be provided with a combination generator and starting motor 40, mounted alongside the engine and having a belt drive connection 41 with the upper end of the engine crankshaft so as to facilitate starting of the engine and to supply charging current to the battery 42 by which the starting motor is energized.

The battery 42 is supported at a location behind the engine 30, by means of a carrier 43 which includes a bracket 44 secured to and extending upwardly from the web of the channel-shaped frame. This bracket also serves to support the forward portion of a rear hood section 45 that covers the sides of the battery and has a downwardly and rearwardly slanting portion which is secured to the frame and provides an instrument panel 46. A main hood 47 extending over and pivoted at its rear as at 48 to the sides of the rear hood section extends forwardly over the battery and the engine to have its front detachably latched (by means not shown) to the upper portion of a grill structure 49 located substantially directly in front of the engine. The grill structure is supported from an inverted U-shaped frame 50 having its legs fixed to the top of the chassis frame at its front.

A steering wheel 51, mounted on the upper end of a steering column 52 that projects through the instrument panel, connects with the front wheels 6 through suitable steering linkage 53 to enable the operator to turn the the front wheels in one direction or the other and thus control the direction of travel of the tractor.

Figure 5:
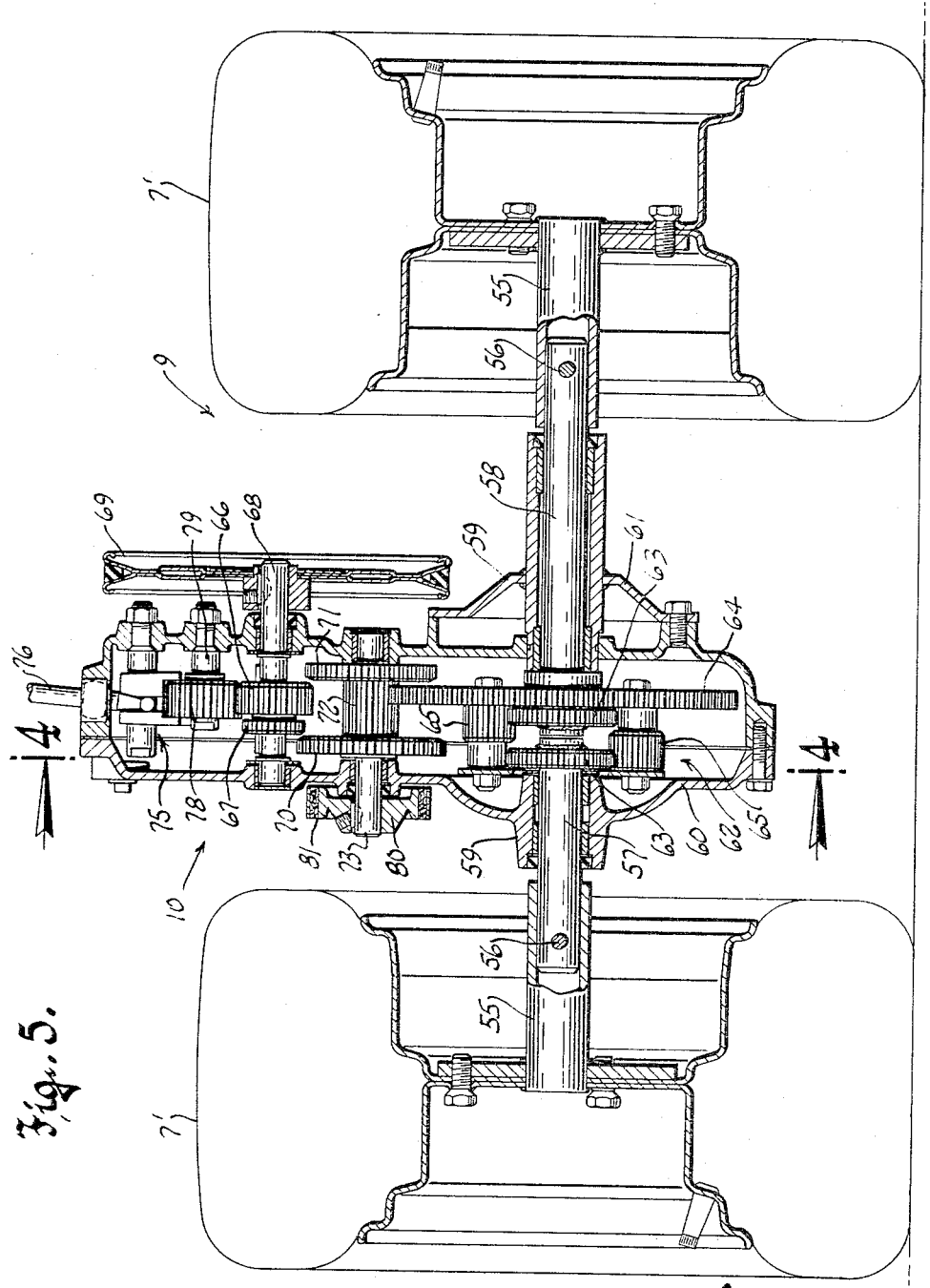
FIGURE 5 is a sectional view through the rear axle structure, taken along the irregular line 5—5 in FIGURE 4.

As seen best in FIGURE 5 the gear case 10, which is part of the rear axle structure, contains a very compact arrangement of speed and direction change gearing that allows the gear case to be made relatively narrow, and consequently provides for the substitution of wheels having extra wide tread super traction tires 7' for the conventional wheels shown in the remaining views. In either case, however, the wheels carry tubular hubs 55 which project inwardly therefrom and are telescoped over the outer ends of the rear axle, to which they are secured by means of pins 56. The rear axle comprises coaxial left and right axle sections 57 and 58, respectively, which project into the gear case 10 from opposite sides thereof and are rotatably journaled in bearings 59 carried by the side walls 60–61 of the gear case. The inner ends of the axle sections terminate in closely adjacent relationship, and are connected by means of a spur gear differential, generally designated 62, of more or less conventional design.

The spur gear differential includes a pair of spur gears 63, one secured to the inner end of each axle section, a large diameter main drive gear 64 coaxially affixed to one of the spur gears 63, and a plurality of sets of meshing pinions 65 which are mounted on the main drive gear 64 for orbital movement therewith and for rotation relative thereto on axes parallel to that of the common axis of the axle sections. As is customary, one of the pinions 65 of each set thereof mesh with one of the spur gears 63 while their companion pinions mesh with the other spur gear.

The speed and direction change gear train incorporated in the gear case 10 includes a compound forward drive gear having axially adjacent high and low speed gear sections 66 and 67, respectively. This gear is keyed to but axially slidably mounted on an input shaft 68 that is journaled in bearings carried by the opposite side walls of the gear case for rotation on an axis parallel to that of the rear axle. One end of the input shaft projects to the exterior of the gear case where it has a substantially large diameter input pulley 69 detachably fixed thereon. The high and low speed gears 66 and 67 normally occupy a neutral position such as seen in FIGURE 5, where they are located between the upper peripheral portions of first and second speed gears 70 and 71, respectively, fixed to the ends of a smaller diameter center gear 72 that is at all times in mesh with the main drive gear 64. The gears 70, 71 and 72 comprise a cluster gear unit that is fixed to a brake shaft 73, which is likewise rotatably journaled in bearings carried by the opposite side walls of the gear case, and which is positioned intermediate the input shaft 68 and the spur gear differential.

Shift mechanism, generally designated 75, that is operated by a manually actuatable gear shift lever 76 readily accessible to an operator occupying the seat 14, provides for sliding the compound forward gear on the input shaft 68 back and forth to selectively mesh its high and low speed sections 66–67 respectively with the second and first speed gears 71–70 on the brake shaft 73. Thus, low speed propulsion of the tractor results when the compound forward gear is shifted to the left of neutral to bring the low speed gear 67 into mesh with the first speed gear 70. Similarly, high speed propulsion is effected by shifting the compound forward gear to the right of neutral to bring the high speed gear 66 thereof into mesh with the second speed gear 71 on the brake shaft.

The gear train also includes a reverse gear 78 axially slidably journaled on a stub shaft 79 carried by one wall of the gear case, and which reverse gear is at all times in mesh with the high speed forward gear 66 on the input shaft. The reverse gear is cooperable with the second speed gear 71 on the brake shaft, and effects reversal of the travel of the tractor when it is shifted into mesh with the gear 71.

While FIGURE 5 illustrates the reverse gear 78 in meshing engagement with the high speed forward gear 66 on the input shaft, reference must be had to FIGURE 4 to appreciate that the reverse gear 78 is also cooperable with the second speed gear on the brake shaft, inasmuch as the FIGURE 5 illustration is not a true section through the gear train but follows the irregular line seen in FIGURE 4.

Figure 2:
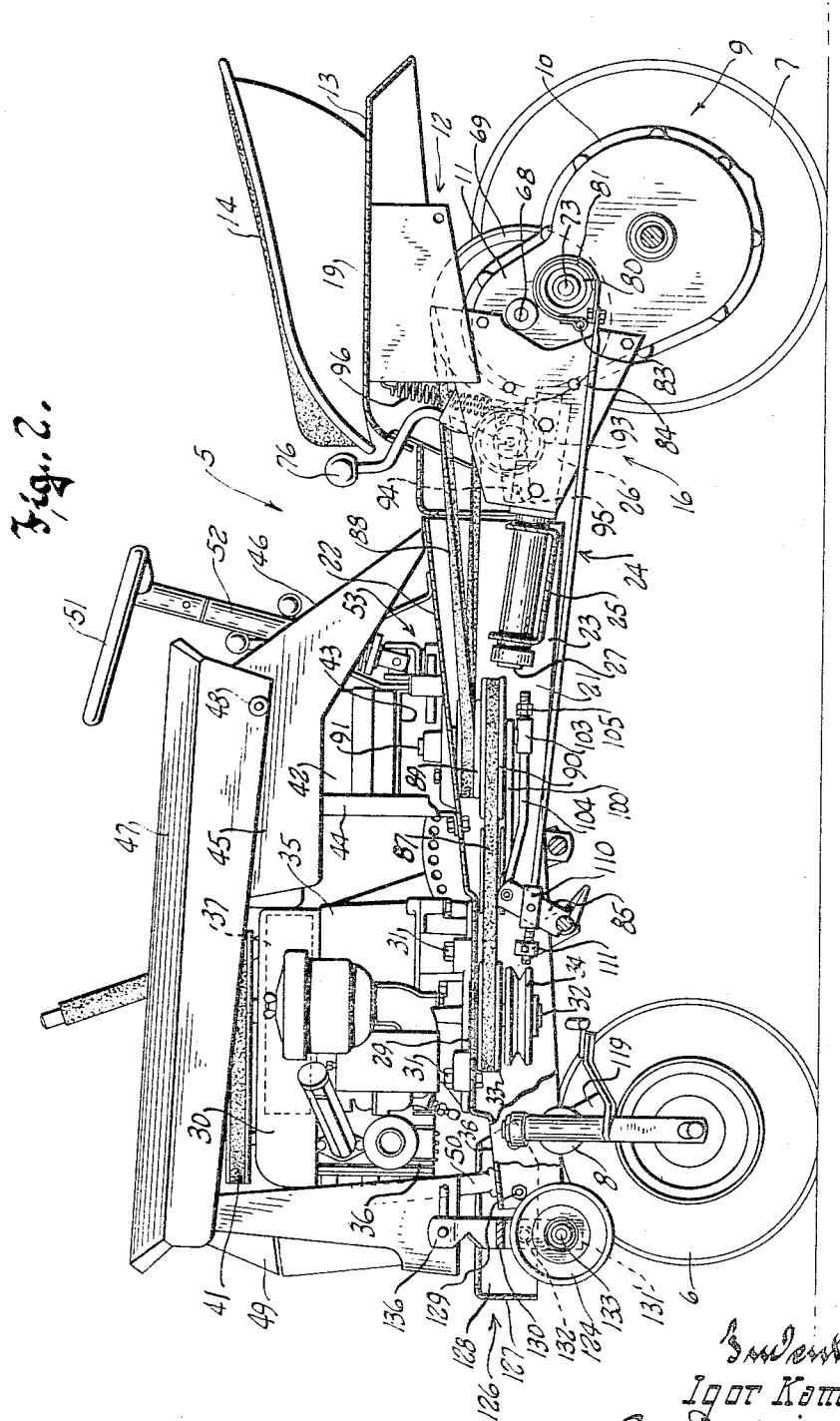
FIGURE 2 is an elevational view of the other side of the tractor, parts thereof being broken away and shown in section.

As seen best in FIGURES 2 and 5, the brake shaft 73 projects from the side of the gear case remote from the input pulley 69, so that a brake drum 80 can be affixed thereto. A brake band 81, having a suitable internal friction surface encircles the drum and has one end anchored to the adjacent side of the gear case as at 83. The other end of the band is secured to an elongated brake rod 84, which extends forwardly therefrom and is attached to a foot operated lever 85 to be described at greater length hereinafter.

Driving torque is transmitted from the drive pulley 33 on the lower end portion of the engine crankshaft to the input shaft 68 of the speed and direction change gearing by flexible endless transmission means comprising a pair of endless belts 87 and 88. These belts cooperate with a pair of axially adjacent idler pulleys 89 and 90 that are fixed together and rotate freely upon an idler shaft 91 that is vertically secured in the web 22 of the channel shaped frame at a location beneath the battery 42. The pulley 89 is somewhat smaller than the pulley 90, and it is located directly below the web of the frame and at a level only slightly below the top of the large pulley 69 on the input shaft 68 of the transmission gearing. The endless belt 88 is trained around the upper idler pulley 89 and around the input pulley 69 with a quarter twist in the belt due to rotation of the latter pulley about a horizontal axis.

The belt 88 has a length great enough to enable both stretches thereof to extend rearwardly toward the input pulley 69 in nearly side by side relationship so as to be close as possible to the underside of the frame and thus clear the swivel joint connection 24 between the front and rear chassis sections. The slack in the belt is taken up by a belt tightener idler pulley 93 that engages the underside of that stretch of the belt which comes forwardly off of the lower peripheral portion of the input pulley 69. The pulley 93 is located directly in front of the input pulley, and it is freely rotatably journaled on the rear portion of an arm 94 that has its front portion pivotally mounted on a stud 95 fixed in the plate 18 on the front of the gear case.

A tension spring 96 connected between the free end of the arm 94 and one of the seat supporting brackets 19 at all times holds the arm swung upwardly to lift and tension the lower stretch of the belt 88, and thus maintain the belt in good torque transmitting relationship with the pulleys 69 and 89.

The other belt 87 is trained about the remaining pulley 90 on the idler shaft and about the drive pulley 33 on the engine crankshaft, and thus cooperates with the belt 88 to transmit rotation from the engine crankshaft to the input pulley 69. As seen best in FIGURE 3, the belt 87 also has a length such as to normally loosely non-drivingly engage around the pulleys 33 and 90 and to thus enable a manually movable belt tightener pulley 99 to control the transmission of driving torque from the engine to the input shaft 68 of the transmission gearing.

The belt tightener pulley 99 is freely rotatably mounted on the forward outer end of an arm 100 which has its rear end swingably journaled upon the lower end portion of the idler shaft 91. In its "drive" position, the pulley 99 bears inwardly upon one of the stretches of the belt 87 to hold it in driving engagement with the pulleys encircled thereby, and it is normally biased to its "drive" position by a tension spring 101, connected between the outer end of the arm 100 and the brake rod 84, as seen best in FIGURE 3.

Another arm 102 that is fixed to the arm 100 at its pivoted end extends transversely from the idler shaft 91 toward the brake rod, and it carries a swivel block 103 at its outer end. The rear end portion of a clutch rod 104 passes loosely through a bore (not shown) in the swivel block and has a pair of lock nuts 105 threaded thereon a short distance behind the swivel block. These nuts are carried into engagement with the swivel block when the clutch rod is pulled forwardly, to cause the belt tightener pulley 99 to be swung counterclockwise out of its "drive" position shown. This, of course, slackens the belt 87 and disrupts the transmission of driving torque to the rear wheels of the tractor. As soon as the clutch rod 104 is released, the tension spring 101 again swings the idler pulley inwardly to its "drive" position so that the transmission of driving torque from the engine to the rear wheels of the tractor is resumed.

The forward end of the rod 104 is connected to the outer end of the same lever 85 that the brake rod 84 is connected with. This lever is secured to a cross shaft 107 having its opposite end portions freely rotatably journaled in cleats 108 fixed to and depending from the flanges 23 of the channel shaped frame. The cleats mount the cross shaft at a location a short distance behind the front axle 8, and slightly rearwardly of the lower end portion of the engine crankshaft. Consequently, when the cross shaft 107 is rocked in the counterclockwise direction seen in FIGURES 2 and 3, the rod 104 is pulled forwardly by the lever 85 to effect disruption of the drive from pulley 33 to pulley 90. Such rocking motion is imparted to the cross shaft by means of a foot pedal 109 (see FIGURE 1) that is secured to an end portion of the cross shaft that extends outwardly beyond one side of the frame.

The foot pedal 109 is not only intended to serve as a clutch pedal to provide for declutching, or disruption of the torque transmitting connection between the engine drive pulley 33 and the pulley 90 on the idler shaft, but when depressed forwardly far enough, it also tightens the brake band 81 about the brake drum 80 to slow and/or stop both forward and reverse movement of the tractor. For this purpose, the brake rod is connected to the lever 85 on the cross shaft 107 by means of a lost motion driving connection consisting of another swivel block 110 secured to an intermediate portion of the lever 85 and having a bore in which the brake rod is lengthwise slidably received, and an adjustable collar 111 that can be fixed to the brake rod at different locations thereon a distance ahead of the block 110.

Normally the collar is located a distance forwardly of the block 110 such that partial depression of the foot pedal 109 against the bias of the pulley spring 101 effects "declutching" of the drive to the idler pulley 90 through the clutch rod 104, and further depression of the foot pedal then transmits forward motion to the brake rod 84 through the engagement of the swivel block 110 with the stop collar 111.

A tension spring 112, seen in FIGURE 3, is connected between the frame and the swivel block 110 to yieldingly hold the foot pedal 109 back against a stop 113 on the side of the chassis frame (see FIGURE 1).

As mentioned previously, the space between the front and rear wheels of the tractor, beneath the frame thereof, can accommodate the rotary lawn mower 15 seen in FIGURE 7. The mower may be of conventional construction having one or more blades that rotate in a horizontal plane, and having a vertical drive shaft with an input pulley 115 fixed thereto at the top of the mower housing. At its rear, the mower is supported by ground engaging rollers 116 that rotate on a common transverse axis.

The rotary mower can be readily tractively coupled to the front portion of the tractor chassis, and for this purpose, its housing carries a pair of arms 118 that extend upwardly and forwardly to have their forward extremities received between and connected to pairs of ears 119 which are fixed to the tubular front axle 8 and extend downwardly and slightly rearwardly therefrom. Pins 120 passing through suitable holes in the ears 119 and through the forward extremities of the arms 118 provide pivotal connections between the mower and the chassis through which the mower is pulled along with the tractor while being free to tilt up and down relative thereto on the pins 120.

The disposition of the rotary mower 15 behind the front axle 8 disposes the input pulley 115 of the former a short distance behind and below the power take off pulley 34 on the engine crankshaft. Driving torque is transmitted from the power take off pulley 34 to the mower input pulley 115 by means of a single endless belt 122. This belt is trained around both pulleys 34 and 115 and its opposite stretches extend forwardly therefrom, to have intermediate portions trained over a pair of idler pulleys 124 that are freely rotatably carried by the chassis of the tractor for rotation on a transverse axis located in spaced relation to both the pulleys 34 and 115, lengthwise of the chassis. While the idler pulleys 124 could be located rearwardly of both the power take off pulley 34 and the mower input pulley 115, in the present instance they have been shown as positioned forwardly of them, and ahead of the axle 8. Consequently, the idler pulleys 124 are located at the extreme front of the chassis, preferably with their tops at the same level as that of the power take off pulley 34.

With the idler pulleys 124 in the location described, each stretch of the belt 122 extends forwardly from the power take off pulley 34, passes over the top of one of the two idler pulleys 124 and then extends rearwardly from the lower edge portion of its idler pulley to the mower input pulley 115.

Although the idler pulleys 124 may be supported directly from the front portion of the frame 21, they have here been illustrated as comprising part of a subassembly that consists of a substantially U-shaped frame extension 126 having its bight 127 extending transversely across the front of the tractor and spaced slightly forwardly of the front extremity of the chassis frame, and opposite side members 128 that extend rearwardly from the extremities of the bight. The side members overlie the outer sides of the flanges 23 on the front of the chassis frame, to which the frame extension is rigidly secured as by means of bolts 129 that pass through the side members 128 and the flanges 23. It will be apparent, therefore, that the U-shaped frame extension 126 provides a bumper, the bight 127 of which constitutes the foremost part of the tractor.

The subassembly also includes a pulley carrier 130 which extends transversely across the space between the opposite side members 128 of the bumper and has downwardly turned end portions 131 which overlie the inner surfaces of the side members. Each end portion 131 of the carrier is connected to its adjacent side member 128 by a single bolt 132, and since the two bolts align on a common transverse axis they provide a pivot about which the carrier may oscillate.

A downwardly extending medial portion 131' of the carrier projects between the two idler pulleys 124 and provides what may be termed an inverted fork that carries a short axle 133, the opposite ends of which project from the fork to support the idler pulleys.

The axle carrying the idler pulleys is located a distance below the axis about which the carrier swings, with the result that the idler pulleys 124 are not only freely rotatable on a transverse axis a short distance directly ahead of the front axle 8, but they are also bodily movable fore and aft, or more particularly, toward and from the power take off pulley 34 on the lower end portion of the engine crankshaft. Consequently, the idler pulleys can be swung forwardly to the belt tensioning position seen in FIGURE 7 at which the belt 122 is operable to transmit driving torque from the power take off pulley 34 to the mower input pulley 115, for operation of the mower. Similarly, the idler pulleys 124 can be swung rearwardly to a slack belt position, not shown, at which the belt 122 loosely engages the power take off pulley 34 and the mower input pulley 115, to disrupt the driving connection therebetween. This arrangement, therefore, not only provides an exceptionally simple way of transmitting driving torque from the vertically disposed crankshaft of the engine 30 to the vertical disposed drive shaft of the rotary mower, but it also provides for control of the drive to the mower shaft entirely independently of the drive to the rear wheels of the tractor.

A hand lever 134 pivotally mounted as at 135 on the upstanding bracket 44 at the left side of the tractor near the instrument panel 46, enables an operator of the tractor to swing the belt tightener or idler pulleys 124 bodily forwardly or rearwardly, toward and from their operative positions. For this purpose, the pulley carrier 130 has an arm 136 fixed thereto and extending upwardly therefrom along the inner side of the bumper side member 128 at the left side of the tractor. A control rod 137 connects the arm 136 with the hand lever 134, so that rearward movement of the latter causes the pulley carrier to swing in the direction to carry the idler pulleys forwardly, thus tensioning the belt 122 into good driving engagement with the power take off pulley 34 and the mower input pulley 115. If the lever 134 is moved forwardly about its pivot 135, it effects reverse swinging of the carrier 131 and bodily movement of the belt tightener pulleys 124 toward the power take off pulley 34 to slacken the belt and disrupt the driving connection between the pulley 34 and the mower input pulley 115.

The described location of the idler or belt tightener pulleys 124 is also advantageous for the reason that it enables the same belt 122 to be used for the transmission of driving torque from the power take off pulley 34 to the drive shaft 140 of a snow thrower 141 that may be tractively coupled to the chassis ahead of the tractor, as seen in FIGURE 8.

In this case the tractive connection between the snow thrower and the front portion of the tractor chassis comprises a sub-frame generally designated 142 which is readily detachably connected to the tractor chassis in a manner to be described shortly. The sub-frame is generally of U-shaped configuration in that it has a bight 143 which extends transversely of the tractor chassis, under the front portion thereof and near the power take off pulley 34, and opposite arms 144 which extend forwardly and downwardly under the axle 8 a distance slightly beyond the bight 127 of the bumper. The front portions of these arms embrace and are detachably secured by bolts 147 to a rearwardly extending housing portion 146 on the snow thrower. The subframe 142 is readily detachably connected to the under side of the tractor chassis by means which comprises the mower attaching ears 119 described previously, and a pair of links 148. Lugs 148' on the arms 144 of the subframe extend upwardly therefrom between the pairs of ears 119 on the axle 8, and are detachably secured thereto by the pins 120.

Each of the links 148 extends downwardly between one of the flanges 23 of the chassis frame and the arm 144 of the subframe therebeneath, and has its opposite end portions flatwise overlying said frame portions and secured thereto by belts 149.

A bracket 150 secured to the bight 143 of the subframe extends forwardly therefrom to have another idler pulley 151 mounted thereon for rotation about an upright axis and at a location a short distance beneath the power take off pulley 34.

The idler pulley 151 more or less takes the place of the mower input pulley 115 in its relation to the idler pulleys 124 and the belt 122 which, it will be noted, is here also trained around the power take off pulley 34 and another pulley (151) that rotates about an upright axis and is located beneath the power take off pulley. Since the idler pulley 151 is located much closer to the front axle 8, however, one of the stretches of the belt 122 after passing over its idler pulley 124, can be pulled forwardly and engaged around an input pulley 152 on the end of the drive shaft 140 for the snow thrower. The drive shaft 140, of course, is arranged to rotate on a transverse axis at the rear of the thrower, spaced forwardly and downwardly of the idler pulleys 124.

In more or less conventional fashion, the rotor drive shaft is connected to the rotor shaft 154 ahead of it by a chain 155 trained around sprockets 156 and 157 on the rotor drive and rotor shafts, respectively.

With the arrangement described, therefore, one stretch of the endless belt 122 extends forwardly over the top of one of the idler pulleys 124 from the power take off pulley 34, and then rearwardly from the underside of that idler to the other idler pulley 151. The other stretch of the belt extends forwardly from the power take off pulley 34 over the top of the other idler pulley 124, downwardly and forwardly around the input pulley 152 on the rotor drive shaft 140, and then back to the rear idler pulley 151.

Again in this case the same hand lever 134 described previously enables the idler or belt tightener pulleys 124 to be swung bodily toward and from the power take off pulley 34 to thus control the transmission of driving torque from the power take off pulley 34 to the rotor drive shaft 140, entirely independently of whether or not driving torque is being transmitted from the engine to the rear wheels of the tractor.

A unique feature of the power take off described is that its two idler pulleys 124 enable the input shaft of an implement or attachment ahead of the tractor to be driven in either direction, depending upon which stretch of the belt 122 is drawn forwardly from the idler pulleys for engagement with the input pulley of the attachment.

There may be times when it is desirable or even necessary to effect lower speed travel of the tractor of this invention, under greater power, than is afforded by the gear train in the gear case 10. Such low speed high power propulsion of the tractor, for example, may be necessary at times when the snow thrower 141 is attached thereto.

For this purpose, the input pulley 69 can be readily replaced with a unique planetary gear attachment 160 having an elongated hub 161 to fit the projecting end of the input shaft 68 of the transmission gearing. The hub is keyed to the input shaft to rotate therewith, and extends outwardly a distance beyond the end of the shaft to have all of the elements of the attachment mounted thereon as a subassembly.

A collar 162 is secured to the inner end of the hub 161 by a set screw 163 that also serves to detachably hold the attachment on the shaft. Spaced axially outwardly from the collar and near the outer end of the hub, a disc-like carrier 164 is welded or otherwise secured to the hub. A pulley hub 165, encircling the hub 161, is axially confined between the abutments provided by the collar 162 and the carrier 164 and is freely rotatable relative to the collar and carrier, and has a large input pulley 69', like that previously described, fixed to its inner end, adjacent to the collar 162.

A sun gear 166 is fixed to the outer end of the pulley hub 165, so that it rotates with the input pulley 69'. This sun gear has teeth on its exterior that mesh with each of a plurality of planet gears 167 that are freely rotatably mounted on studs 168 fixed in the carrier 164.

These gears are enclosed within a hollow drum-like housing 169 comprising cooperating inner and outer pan-like housing sections 170 and 171, respectively, having outwardly directed flanges 172 at their mating peripheral portions secured together by bolts 173. The housing is supported from the hub 161 by means of a stub shaft 175 that is secured to the bottom 176 of the outer housing section and projects loosely into a reduced bore 177 in the hub, so as to mount the housing for axial motion relative to the input shaft 68.

Confined between the flanges 172 of the housing sections and fixed thereto by means of the bolts 173 is a ring gear 178 that surrounds the planet gears 167 and has internal teeth at all times in mesh with those of the planet gears; and a shifter ring 179 that has a peripheral portion extending radially beyond the exterior of the housing.

With the construction of the planetary attachment described thus far, the sun gear 166 will rotate with the input pulley 69' whenever the latter is driven from the tractor engine, and the planet gears 167 which mesh with the sun gear will impart rotation from the pulley to the hub 161 through their meshing engagement with the internal ring gear 178, providing the housing 169 is held against rotation relative to the pulley 69'.

The attachment operates to directly transmit driving torque from the input pulley 69' to the input shaft 68 through a jaw clutch comprising an inner jaw member 181 fixed on the pulley hub 165 adjacent to the outer side of the input pulley, and an outer jaw member 182 that is fixed to the bottom 170' of the inner housing section 170. These jaw members have teeth 183 that are meshingly engaged with one another to lock the housing and hence the ring gear 178 to the input pulley 69' when the housing is shifted axially toward the input pulley to its direct drive position seen in FIGURE 9, which position is defined by the engagement of detent balls 184 in the axially innermost one of a pair of annular grooves 185 in the wall of the bore 177. A spring 186 yieldingly urges the balls outwardly into engagement with the designated groove and resists axial motion of the housing to the slow drive position seen in FIGURE 10, where the balls engage in the outer groove 185 and the teeth of the inner and outer jaw clutch members are out of mesh.

In the FIGURE 9 position of the planetary attachment, of course, the housing and the ring gear 178 carried thereby cannot rotate relative to the input pulley 69' but are locked thereto and will cause rotation to be imparted to the planet gear carrier 164 and hence to the hub 161 and input shaft 68, by reason of the meshing engagement of the planet gears with both the sun gear 166 and the ring gear 178.

When the housing is shifted to the slow drive position seen in FIGURE 10, the jaw clutch is disengaged, as heretofore mentioned, and the head 173' of one of the housing bolts is carried into cooperative relationship with a stop 187 that is carried by the gear case 10, to hold the housing 169 against rotation. In this position, therefore, the meshing engagement of the planet gears with the rotating sun gear and now stationary ring gear causes the planet gears to more or less roll along the inside of the ring gear and thus impart rotation at a slow rate to the hub 161 and the input shaft 68.

The housing 169 can be translated axially between its direct and slow drive positions by means of a shifter mechanism that is pivotally supported as at 189 from a bracket 190 secured to the adjacent side of the gear case 10. A hand lever 191 (see FIGURE 1) attached to the shifter mechanism enables the latter to be swung back and forth as described, and the shifter mechanism, of course, has a motion transmitting connection with that portion of the shifter ring 179 that projects beyond the flanges 172 of the housing sections. This motion transmitting connection comprises rollers, not shown, carried by the shifter mechanism and bearing upon opposite faces of the shifter ring to enable the housing 169 to rotate freely relative to the shifter mechanism at times when the attachment is in its direct drive position seen in FIGURE 9.

The stop 187 described previously, may be formed as a part of the bracket 190.

It should be borne in mind, of course, that the speed and direction change gearing in the gear case 10 is augmented by the planetary attachment seen in FIGURES 9 and 10, which thus provides a lower speed drive for each of the low and high speed gear positions as well as the reverse gear position when the planetary attachment is in its operative position seen in FIGURE 10.

From the foregoing description, together with the accompanying drawings, it will be readily apparent to those skilled in the art that this invention provides a riding tractor featuring a power source comprising a low cost vertical shaft engine and having such desirable attributes as low silhouette and center of gravity with improved stability as a result; power take off means that simplifies the transmission of driving torque to the work performing elements of implements that may be tractively coupled to the tractor and gives greater freedom of movement to the implements than was possible heretofore; and a readily attachable planetary gear unit that augments the speed and direction change gearing of the tractor to provide additional speeds forward and in reverse, to make greater power available when needed.

What is claimed as my invention is:

1. A tractor of the type that is characterized by a chassis which comprises an elongated frame extending fore and aft of the tractor, a front axle structure having wheel means supporting the front portion of the frame, and a rear axle structure from which the rear portion of the frame is supported, said rear axle structure including a pair of coaxial drive wheels at opposite sides of the chassis, and said tractor being further characterized by:
   A. a prime mover mounted on the frame at the front portion thereof;
   B. a prime mover driven power member disposed at the underside of the frame and rotatable about an axis fixed with respect to the frame;
   C. housing means providing part of the rear axle structure, said housing means being located between the drive wheels and having an upper portion disposed a distance above the axis of the drive wheels, and said housing means containing
      (1) drive mechanism including reversible torque transmitting means drivingly connectable with the drive wheels, and
      (2) an input shaft carried by the housing means for rotation about a horizontal axis located at a level below the top of the rear portion of the frame forwardly of and above the axis of the drive wheels, said input shaft being connected with said drive mechanism and having an end portion projecting from the housing means;
   D. torque transmitting means extending fore and aft of the frame, entirely at the underside thereof, to drivingly connect said end portion of the input shaft with the power member; and
   E. cooperating elements on said upper portion of the housing means and on the rear portion of the frame supporting the latter from the rear axle structure and providing a pivotal connection therebetween by which the frame can rock relative to the rear axle structure from side to side about an axis that extends fore and aft of the chassis.

2. The tractor of claim 1, characterized further in that:
   A. the axis of the input shaft and said pivotal connection are substantially at the same level as said power member, so as to provide for relative side to side rocking motion between the frame and the rear axle structure without interfering with the operativeness of said torque transmitting means.

3. The tractor of claim 2, characterized further in that:
   A. the rear end of the frame terminates short of said upper portion of the housing means;
   B. and said cooperating elements comprise
      (1) bearing brackets on the rear portion of the frame and on said upper portion of the housing means,
      (2) and a sahft carried jointly by said bearing brackets.

4. A tractor of the type is characterized by a chassis which comprises an elongated frame extending fore and aft of the tractor, steerable wheel means supporting the front portion of the frame, and a rear axle structure from which the rear portion of the frame is supported, said rear axle structure including a pair of coaxial drive wheels at opposite sides of the chassis, and further characterized by:
   A. a vertical shaft prime mover mounted on the top of the frame at the front portion thereof, and having a lower portion of its power shaft projecting downwardly through and disposed below the top of the frame;
   B. a gear case providing part of the rear axle structure and located between said drive wheels, said gear case containing
      (1) speed change gearing drivingly connected with the drive wheels,
      (2) and an input shaft carried by the gear case and constrained to rotate about a horizontal axis extending transversely of the chassis and located at a level below the top of the rear portion of the frame, the input shaft being connected with said gearing and having an end portion projecting from the gear case;
   C. and means to drivingly connect said end portions of the power and input shafts, comprising
      (1) an idler shaft carried by the frame with its axis vertical and spaced a distance rearwardly of the power shaft,
      (2) a pair of axially adjacent pulleys on the idler shaft, constrained to rotate in unison,
      (3) pulleys on said end portions of the power and input shafts,
      (4) a first endless belt trained about the power shaft pulley and one of the pulleys on the idler shaft,
      (5) and a second endless belt trained about the input shaft pulley and the other pulley on the idler shaft.

5. The tractor of claim 4 wherein one of said belts has a length to normally loosely encircle its pulleys, and characterized further by:
   A. a belt tightener pulley which is cooperable with a stretch of said one belt;
   B. and means supporting said belt tightener pulley from the frame for movement toward and from belt tightening engagement with said stretch of said one belt so as to provide for control of the transmission of driving torque to said input shaft.

6. The tractor of claim 5, wherein: said one pulley on the idler shaft is in horizontal alignment with the pulley on the power shaft and is under said other pulley on the idler shaft; the belt tightener pulley is cooperable with a stretch of said first belt; and said supporting means for the belt tightener pulley comprises an arm freely rotatably carrying the belt tightener pulley at one end portion thereof, and having its other end portion freely rotatably mounted on the idler shaft for back and forth movement about the axis thereof.

7. A tractor of the type that is characterized by a chassis having front and rear wheels which support an elongated frame that extends fore and aft of the chassis, and which has a seat at its rear, characterized further by:
- A. an air cooled internal combustion engine having
  - (1) a vertical crankshaft,
  - (2) a crankcase,
  - (3) a cylinder extending horizontally from the crankcase,
  - (4) and a flywheel impeller on the upper end of its crankshaft, above the crankcase and cylinder, for blowing cooling air downwardly across the cylinder;
- B. a substantially horizontal engine supporting platform on a front portion of the frame;
- C. means mounting the engine on said platform with its crankshaft extending downwardly through the frame, its crankcase rearmost, and its cylinder extending forwardly therefrom toward the front of the chassis so as to be farthest from an operator of the tractor occupying the seat at its rear;
- D. and the frame having a top portion that slopes downwardly and forwardly from said platform and under the engine cylinder, so as to serve as a deflector by which air blown downwardly past the cylinder is directed forwardly, away from an operator occupying the seat at the rear of the tractor.

8. A tractor of the type that is characterized by a chassis which comprises an elongated frame extending fore and aft of the tractor, a front axle structure having wheels supporting the front portion of the frame, and a rear axle structure from which the rear portion of the frame is supported, said rear axle structure including a pair of coaxial drive wheels at opposite sides of the chassis, and characterized further in that:
- A. the frame comprises a channel shaped member having a substantially flat web and spaced apart depending flanges;
- B. a vertical shaft prime mover is mounted on the web of the frame member at the front portion thereof, with its power shaft projecting downwardly through the web and its lower end portion disposed below the web and between said flanges;
- C. a gear case located between the drive wheels comprises part of the rear axle structure and contains
  - (1) speed and direction change gearing drivingly connected with the drive wheels,
  - (2) and an input shaft that rotates about a horizontal axis located at a level below the rear portion of the frame web, said input shaft having an end portion projecting laterally from the gear case;
- D. and said lower end of the power shaft is drivingly connected with the input shaft by means which comprises
  - (1) an idler shaft carried by the frame web with its axis vertical and spaced a distance rearwardly of the lower end portion of the power shaft,
  - (2) a pair of axially adjacent idler pulleys on the idler shaft and constrained to rotate in unison,
  - (3) a first endless belt trained about the power shaft pulley and one of said idler pulleys,
  - (4) and a second endless belt trained about the input shaft pulley and the other idler pulley.

9. The tractor of claim 8, wherein said first belt has a length to normally loosely encircle its pulleys, and characterized further by:
- A. a belt tightener pulley which is cooperable with one stretch of said first belt;
- B. and means supporting said belt tightener pulley from the idler shaft for movement toward and from belt tightening engagement with said stretch of the first belt.

10. A tractor of the type having a chassis including pairs of front and rear wheels, and which is characterized by:
- A. an elongated front chassis section extending rearwardly from the front wheels;
- B. a short rear chassis section extending forwardly from the rear wheels toward the rear of the front chassis section;
- C. means pivotally connecting the rear of the front chassis section to the front of the rear chassis section to provide for relative rocking motion between said chassis sections about an axis that extends lengthwise of the tractor and lies in a vertical plane containing the longitudinal centerline of the tractor;
- D. an internal combustion engine carried by the front portion of said front chassis section substantially over the front wheels;
- E. and means on said front chassis section defining a horizontal engine supporting platform upon which the engine is mounted, and substantial portions of which platform lie adjacent to but beneath a forward extension of said pivot axis.

11. A tractor of the type that is characterized by a chassis having front and rear wheels which support an elongated frame that extends fore and aft of the chassis, and which has a seat at its rear, characterized further by:
- A. an air cooled internal combustion engine having
  - (1) a vertical crankshaft,
  - (2) a crankcase,
  - (3) a cylinder extending horizontally from the crankcase,
  - (4) and a flywheel impeller on the upper end of its crankshaft, above the crankcase and cylinder, for blowing cooling air downwardly across the cylinder;
- B. a substantially horizontal engine supporting platform on a front portion of the frame;
- C. means mounting the engine on said platform with its crankshaft extending downwardly through the frame, its crankcase rearmost, and its cylinder extending forwardly therefrom toward the front of the chassis so as to be farthest from an operator of the tractor occupying the seat at its rear;
- D. and means fixed with respect to the front portion of the frame serving as a deflector by which air blown downwardly past the cylinder is directed away from an operator occupying the seat at the rear of the tractor.

References Cited by the Examiner
UNITED STATES PATENTS

| | | | |
|---|---|---|---|
| 2,840,389 | 6/1958 | Page | 280—111 |
| 2,924,928 | 2/1960 | Rhoades et al. | 56—25.4 |
| 2,931,156 | 4/1960 | Fulwider | 280—111 X |
| 2,940,534 | 6/1960 | Chattin | 180—53 |
| 3,003,574 | 10/1961 | Strunk | 180—70 |
| 3,038,288 | 6/1962 | Deptula et al. | 56—25.4 |
| 3,054,468 | 9/1962 | Tapp et al. | 280—111 X |
| 3,059,397 | 10/1962 | Anderson et al. | 180—70 X |
| 3,187,821 | 6/1965 | Kamlukin | 180—53 X |

A. HARRY LEVY, *Primary Examiner.*